United States Patent
McConnell et al.

(10) Patent No.: US 7,217,182 B1
(45) Date of Patent: May 15, 2007

(54) DEER EVISERATING PROTECTIVE TOOL AND METHOD

(76) Inventors: William R. McConnell, 301 Upper Sand Valley Rd., Jonesborough, TN (US) 37659; C. Harry Stanley, 514 Baye Rd., Rutledge, TN (US) 37861

( * ) Notice: Subject to any disclaimer, the term of this patent is extended or adjusted under 35 U.S.C. 154(b) by 0 days.

(21) Appl. No.: 11/390,543

(22) Filed: Mar. 25, 2006

(51) Int. Cl.
*A22C 17/00* (2006.01)

(52) U.S. Cl. ..................................... 452/198

(58) Field of Classification Search ........ 452/102–105, 452/123, 124, 1–6; D7/642, 645, 649–652; 128/95.1, 96.1, 839, 840
See application file for complete search history.

(56) References Cited

U.S. PATENT DOCUMENTS

| | | | | | |
|---|---|---|---|---|---|
| 512,961 | A | * | 1/1894 | Haviland | 128/839 |
| 536,540 | A | * | 3/1895 | Paine | 128/839 |
| 2,536,065 | A | * | 1/1951 | Kollander | 452/105 |
| 2,556,797 | A | * | 6/1951 | Carlson | 15/236.01 |
| 2,561,359 | A | * | 7/1951 | Gorton | 452/3 |
| 2,615,195 | A | * | 10/1952 | O'Loughlin | 452/105 |
| 2,618,011 | A | * | 11/1952 | Wunderlich | 452/105 |
| 2,647,278 | A | * | 8/1953 | Weinberger | 452/3 |
| 2,648,094 | A | * | 8/1953 | Paoli | 452/3 |
| 6,210,263 | B1 | * | 4/2001 | Meyer | 452/120 |
| D448,141 | S | * | 9/2001 | Huang | D2/642 |
| 6,426,132 | B1 | * | 7/2002 | Stewart | 428/137 |
| D479,764 | S | * | 9/2003 | Fink, Sr. | D2/642 |

* cited by examiner

*Primary Examiner*—Thomas Price

(57) ABSTRACT

A protective tool for assisting in field dressing a deer, the tool having a protective shield of a convenient width and contour to be slid thru an incision made thru the belly skin of a deer just forward of the pelvic crest and hence into and thru the pelvic cavity between the inner surface of the crest and the colon, whereby the crest can then be sawed thru longitudinally along the crest without danger of the saw cutting into the colon or adjacent viscera and releasing meat damaging fluids.

17 Claims, 3 Drawing Sheets

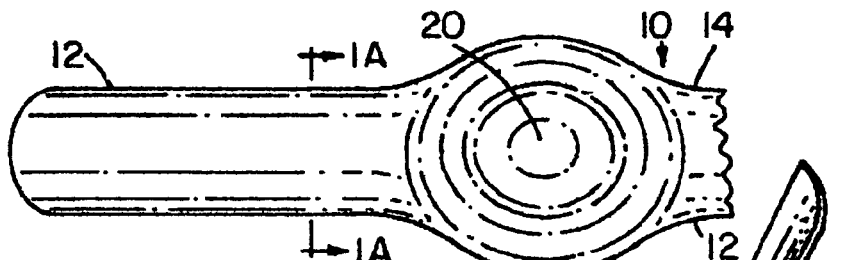
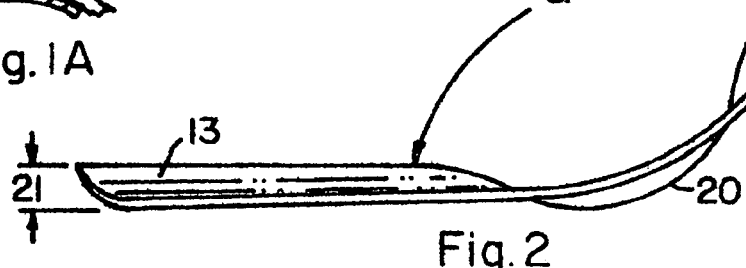
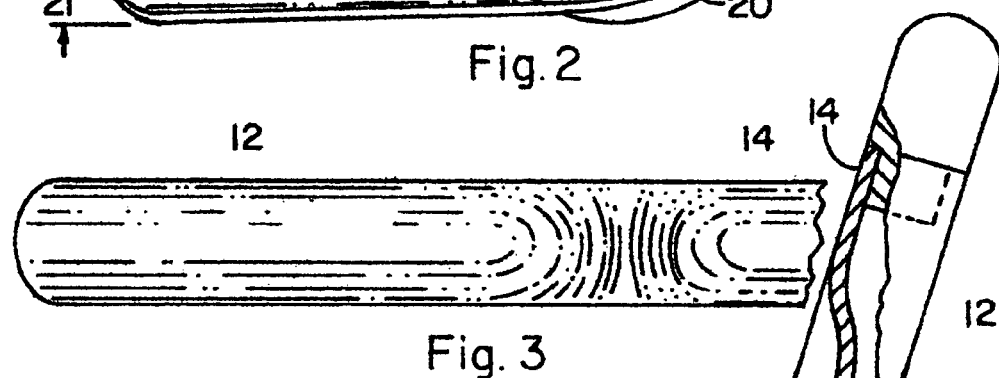
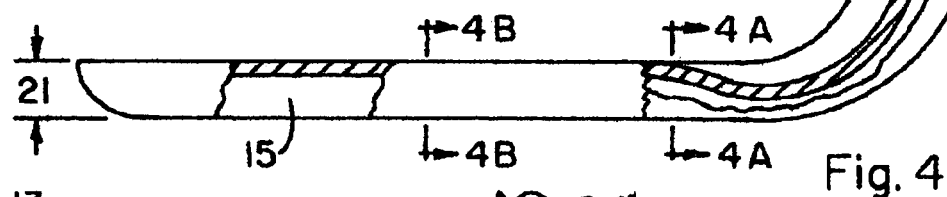
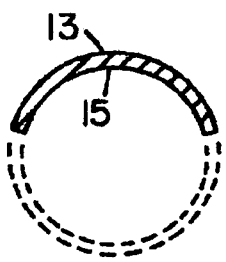
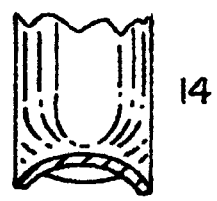
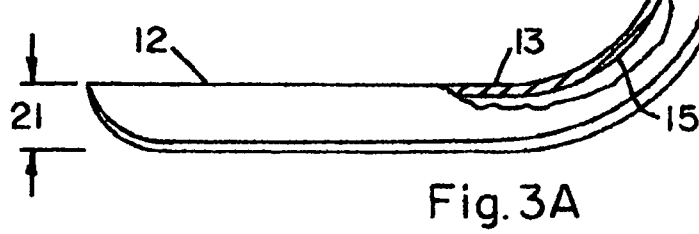

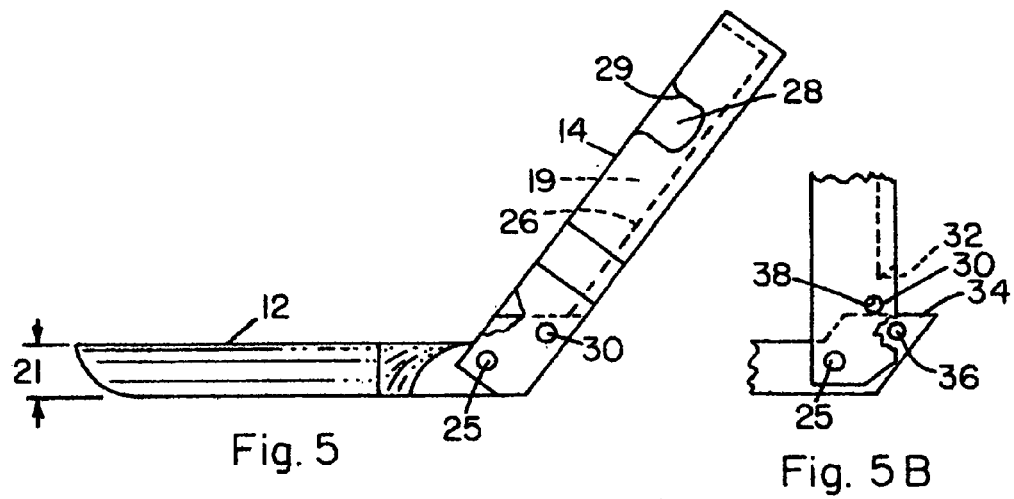
Fig. 5
Fig. 5B
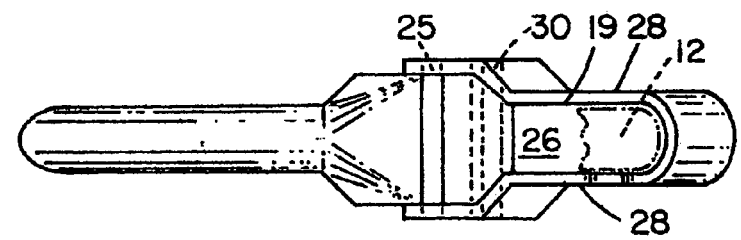
Fig. 5A
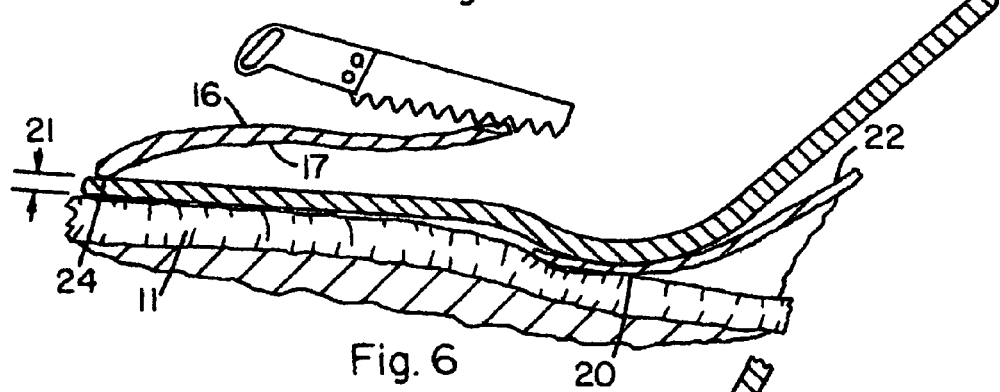
Fig. 6
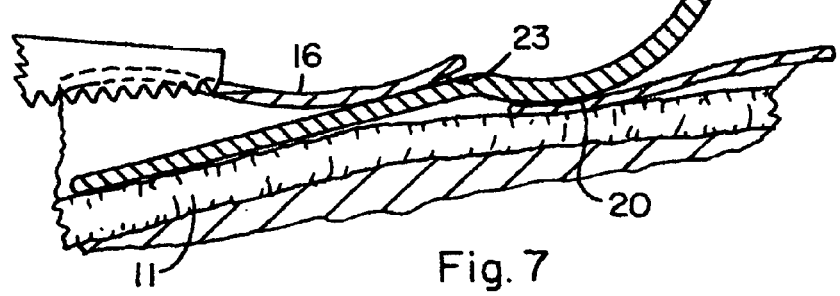
Fig. 7

DEER EVISERATING PROTECTIVE TOOL AND METHOD

BACKGROUND OF THE INVENTION

1. Field

The present invention concerns a protective shield and method of use for assisting in the field dressing of a game animal such as deer or elk whereby the internal organs (viscera), particularly the colon, urine tube and bladder of the animal are maintained isolated from the interior surface of the crest (pubic symphysis) of the pelvic bone. With this shield the crest cartilage can be cut thru quickly longitudinally by a saw or other device without fear of cutting into the viscera and releasing fluids which could ruin the meat.

2. Prior Art

Heretofore, the crest of the pelvic bone has been cut thru longitudinally with a knife held upwardly with the hand and handle inserted thru the anterior opening of the pelvic bone and the blade forcing thru the crest from front to rear, or by means of scissor type instrument, or by a bone saw or the like. Such methods, as previously carried out are difficult, time consuming and often lead to puncturing of the viscera.

With the present protective tool, the pelvic crest can be cut thru quickly and safely, the pubic bone halves easily pulled apart and the underlying viscera including bladder, colon and urethra easily removed.

SUMMARY OF THE INVENTION

The invention in one of its preferred embodiments provides a protective tool comprising a thin rigid shield having sufficient width to laterally cover an animal's colon and having a length to cover the colon portions underlying the pelvic crest, said shield being connected to a handle, portions of the upper side of the shield having a convex lateral contour and being adapted for insertion thru a cut made thru the skin of a deer just forward of the pelvic crest, said tool further having a handle wherein the shield and handle are oriented at an included angle of from about 80° to about 170°, whereby the shield can be pushed rearwardly by the handle between the inner surface of the pelvic crest and the internal organs of the animal to adjacent the anal end of the colon to provide a shield against penetration of a cutting device such as a bone saw into the viscera during longitudinal cutting and separation of the pelvic bone halves.

BRIEF DESCRIPTION OF THE DRAWINGS

The invention will be understood further from the following description and drawings wherein the figures are not drawn to scale and the structures not shown in consistent proportions, wherein certain structural portions are broken away for clarity, and wherein:

FIG. 1 is a top view of a preferred configuration of the tool having two end shields and an intermediate bowl-shaped viscera depressor portion;

FIG. 1A is cross-sectional view along line 1A—1A of the tool in FIG. 1 relative to the pelvic crest;

FIG. 2 is a side view of the tool of FIG. 1;

FIG. 3 is a top view of a substantially uniform width variation of the tool configuration and having two end shields;

FIG. 3A is a side view of the tool of FIG. 3;

FIG. 4 of a single end shield tool made of aluminum round tubing, side view;

FIG. 4A is a view of the tool of FIG. 4 taken along line 4A—4A in FIG. 4 and showing the tube bending indent portion;

FIG. 4B is a cross-sectional view taken along line 4B—4B in FIG. 4 and showing the removed bottom metal portion in dotted line;

FIG. 5 is a side view of an embodiment of the tool having mutually collapsible shield and handle for ease of carrying or storage;

FIG. 5A is a top view of the tool of FIG. 5;

FIG. 5B is a side view of the dotted area in FIG. 5 with the handle and shield partially pivoted counterclockwise toward their storage position;

FIG. 6 is a longitudinal cross-sectional view showing a saw starting a cut thru the anterior portion of the pelvic crest with the tool rotated downwardly about a posterior portion of the crest and depressing the adjacent anterior viscera;

FIG. 7 is a view as in FIG. 6 showing the saw finishing the crest cut with the tool rotated downwardly about an anterior portion of the crest and depressing the adjacent posterior viscera;

DETAILED DESCRIPTION

Figure 8:
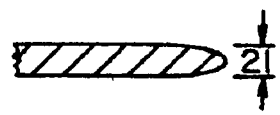
FIG. 8 is a cross-sectional substantially flat lateral embodiment of the shield.

Referring to the drawings, the present tool comprises a rigid body 10 of metal, wood, ceramic or plastic providing a shield 12 and a handle 14, which, e.g., can also function as a shield when so configured in accordance with the present invention. Each shield 12 can be flat (FIG. 8) or contoured (FIG. 9), and preferably has a lateral convex upper surface 13 and a lateral concave inner or lower surface 15, each surface having a selected radius, e.g., of from 0.0 in. up to about 2.5 in., preferably both surfaces having a lateral contour on a radius of from about 0.3 in to about 1.5 in., such that surface 13, in an initial inserted position can lie substantially contiguous the inner surface 17 of pelvic crest 16.

Each shield 12 preferably has a length of about 3–9 in., which length is adequate to extend the full length of the colon portion 11 which underlies the pelvic crest of most deer or elk. As mentioned above the handle section 14 can be made of the same shape as any of shield 12 as shown, e.g., in FIGS. 2–4, and if desired, of a shorter length such as from about 2 to 5 in. so as to shield the viscera of smaller animals. It is noted that the angularity "α" between structures 12 and 14 can range widely, e.g., between about 80° to about 170°, but most preferably from about 90° to about 140° whereby the handle does not interfere with the sawing process.

Figure 9:
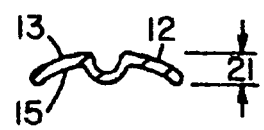
FIG. 9 is a view as in FIG. 8 showing a further lateral configuration embodiment of the shield.
Figure 10:
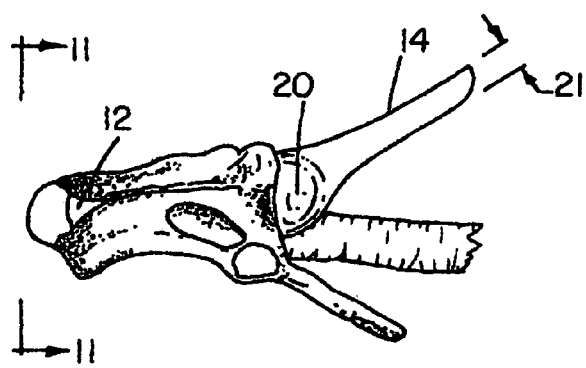
FIG. 10 is generally a side view of a pelvic bone and simulated colon tipped about 20° toward the viewer with the tool of FIG. 1 inserted therethrough between the crest and the colon.
Figure 11:
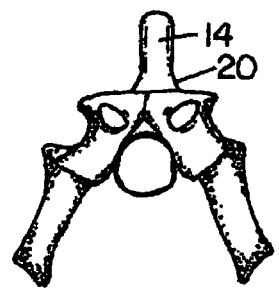
FIG. 11 is an end view of FIG. 10 taken along line 10—10 thereof.

As shown in FIG. 9, the lateral contours of surfaces 13 and 15 do not have to be continuous, but continuous is preferred. In FIG. 9, the groove 18 can serve to receive a saw blade and act as a guide to make the cutting easier.

Referring to FIGS. 1, 2, 6 and 7, each shield 12 preferably has a generally bowl shaped (FIGS. 1 and 2) or flat generally rectangular (FIGS. 5–7) depressor portion 20 whereby, as shown in FIG. 6, the skin 22 and underlying viscera forward of the crest can be depressed out of the way by pivoting the tool downwardly on pivot point 24 on the crest as the crest cut is initiated. This depressor portion preferably has a skin contact area of from about 1.5 to about 8.0 in². As shown in FIG. 7, the tool can be pivoted downwardly around pivot point 23 on the crest to depress the rearward viscera out of the way during finishing of the cut.

The shield, with or without the lateral contour has an integrated thickness 21 of from about 1/64 in. to about 3/4 in.

Referring to FIGS. 5, 5A and 5B, the tool is shown to have a shield and handle which are collapsible by pivoting around pivot pin 25 for storage or carrying. In this embodiment, the handle 14 is recessed at 19 to form a floor 26 bordered by a wall 28, both of which are configured to receive the shield in a nesting compact manner, a portion of which shield is shown by dotted line in FIG. 5A. As shown in these FIGS., a removable locking pin 30 (shaft or bolt or screw) is employed to lock the handle and shield in operative position as in FIGS. 5 and 5A, and is removed as in FIG. 5B to allow the shield and handle to pivot. Stop shoulder 32 on the handle and stop shoulder 34 on the shield limit the clockwise pivoting of the handle relative to the shield such as to align the locking pin bore 36 in the shield with the locking pin bearing 38 in the wall portions 40 of the handle. It is noted that the shapes and location of shoulders 32 and 34 can be varied in order to provide a desired angularity "α". Also, the lateral configuration of the recess 19 relative to the width or other dimension of the shield can be varied, such, e.g., to allow the folded, nested shield to be finger gripped for lifting it out of recess 19. In this regard, as shown in FIG. 5, a cut out 29 in wall 28 will allow the shield to be finger urged out of the recess.

Figure 12:
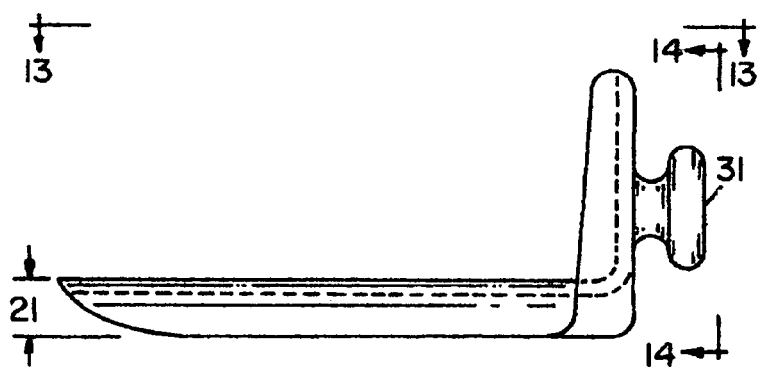
FIG. 12 is a side view of a further variation of the tool.
Figure 14:
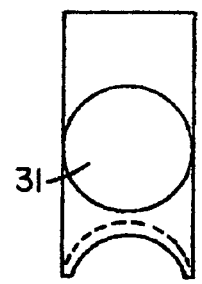
FIG. 14 is an end view taken along line 14—14 in FIG. 12.
Figure 13:
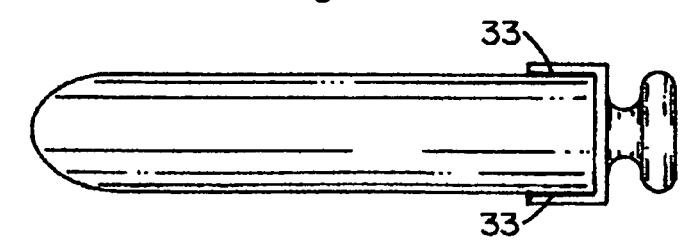
FIG. 13 is a top view taken along line 13—13 in FIG. 12.

In FIGS. 12–14 a further structural variation of the tool is shown as having a handle grip knob 31 and a rigid shortened handle 14 welded, brazed or the like at 33 to an elongated, e.g., 6–9 in. shield.

The invention has been described in detail with particular reference to preferred embodiments thereof, but it will be understood that variations and modifications will be effected with the spirit and scope of the invention.

We claim:

1. A protective tool for assisting in field dressing an animal wherein an incision has been made thru the skin of the animal adjacent the forward end of the pelvic crest, said tool comprising a protective shield and a handle connected thereto, said shield having an upper surface and a lower surface, a first longitudinal dimension, and being of rigid material having an integrated thickness of from about 1/64 in. to about 3/4 in., a uniform or varying width of from about 0.5 in. to about 6.0 in., and a length of from about 3.0 in. to about 9.0 in., wherein the shield has a distal portion and a proximal portion lying in said first longitudinal dimension, and wherein the upper surface of said distal portion is laterally convex, said shield and handle being connected together at the proximal portion of said shield at an included angle "α" of from about 80° to about 170°, and wherein said shield is free of any abrasive or jagged edges or surfaces, whereby said shield can be pushed by said handle thru said incision and rearwardly under said pelvic crest to overlie the viscera of the animal which lies under the pelvic crest without damage to the viscera, and thereby to protect the viscera from being ruptured by a cutting device being used to cut thru the pelvic crown longitudinally thereof.

2. The tool of claim 1 wherein said shield has a substantially uniform width throughout substantially its entire length.

3. A protective tool for assisting in field dressing an animal wherein an incision has been made thru the skin of the animal adjacent the forward end of the pelvic crest, said tool comprising a protective shield and a handle connected thereto, said shield having an upper surface and a lower surface and a first longitudinal dimension, said handle having a second longitudinal dimension, said shield being of rigid material having an integrated thickness of from about 1/64 in. to about 3/4 in., a uniform or varying width of from about 0.5 in. to about 6.0 in., and a length of from about 3.0 in. to about 9.0 in., said shield and handle being connected together at an included angle "α" of from about 80° to about 170°, said shield further having a distal portion and a proximal portion lying in said first longitudinal dimension, wherein the distal portion has a substantially uniform width of from about 0.75 in. to about 1.5 in., and wherein the proximal portion has a generally circular lateral bowl-shaped configuration having a diametric dimension of from about 2.0 in to about 6.0 in., whereby said shield can be pushed by said handle thru said incision and rearwardly under said pelvic crest to overlie the viscera of the animal which lies under the pelvic crest and thereby to protect the viscera from being cut into by a cutting device being used to cut thru the pelvic crown longitudinally thereof.

4. The tool of claim 3 wherein said distal portion of said shield has a leading end having a smooth outwardly radiused lateral configuration.

5. The tool of claim 3 wherein an upper surface of said proximal portion has a lateral concave contour.

6. The tool of claim 5 wherein said contour is on a radius of from about 0.3 in. to about 1.5 in.

7. The tool of claim 3 wherein said handle is pivotally connected to said shield adjacent to the rear of said proximal portion wherein a pivot axis of said handle lies substantially in a horizontal plane of said distal portion whereby said handle can be folded down toward said shield for storage or transport, and wherein cooperating lock shoulder means are provided on said shield and handle for maintaining a desired attitude of said handle relative to said shield during use of said tool.

8. The tool of claim 7 wherein said lock shoulder means comprises a generally axial first bearing aperture means thru one of said sections, a cooperating second bearing aperture means thru the other of said sections, and pivot shaft means inserted thru both of said aperture means to form a pivot joint.

9. The method for field dressing an animal having a pelvic bone, said method comprising making an incision thru the belly skin of the animal just forward of the pelvic crest, inserting a protective tool thru said incision and thru the pelvic cavity between the inner surface of the pelvic crest and the colon to adjacent the anal end of the colon, longitudinally sawing thru the crest with the tool underlying the pelvic crest and absorbing impact of the saw during the sawing operation.

10. The method of claim 9 wherein said tool comprises a shield and a handle connected thereto, said shield having an upper surface and a lower surface and a first longitudinal dimension, said handle having a second longitudinal dimension, said shield being of rigid material having an integrated thickness of from about 1/64 in. to about 3/4 in., a uniform or varying width of from about 0.5 in. to about 6.0 in., and a length of from about 3.0 in. to about 9.0 in., said shield and handle being connected together at an included angle "α" of from about 80° to about 170°, whereby said shield can be pushed by said handle thru said incision and rearwardly under said pelvic crest to overlie the viscera of the animal which lies under the pelvic crest and thereby to protect the viscera from being cut into by a cutting device being used to cut thru the pelvic crown longitudinally thereof.

11. The method of claim 10 wherein the shield has a distal portion and a proximal portion lying in said longitudinal dimension, wherein the distal portion has a substantially uniform width of from about 0.75 in. to about 1.5 in., and wherein the proximal portion has a generally circular lateral bowl-shaped configuration having a lateral diametric dimension of from about 2.0 in. to about 6.0 in.

12. The method of claim 11 wherein said distal end portion of said shield has a leading end having a smooth outwardly radiused lateral configuration.

13. The method of claim 11 wherein an upper surface of said proximal portion has a lateral concave contour.

14. The method of claim 13 wherein said contour is on a radius of from about 0.3 in. to about 1.5 in.

15. The method of claim 11 wherein said handle is pivotally connected to said shield adjacent to the rear of said proximal portion wherein a lateral pivot axis of said handle lies substantially in a horizontal plane of said distal portion whereby said handle can be folded down toward said shield for storage or transport, and wherein cooperating lock shoulder means are provided on said shield and handle for maintaining a desired attitude of said handle relative to said shield during use of said tool.

16. The method of claim 15 wherein said lock shoulder means comprises a generally lateral axial first bearing aperture means thru one of said shield or handle, a cooperating second bearing aperture means thru the other of said shield or handle, and pivot shaft means inserted thru both of said aperture means to form a pivot joint.

17. The method of claim 10 wherein said shield has a substantially uniform width throughout substantially its entire length.

* * * * *